United States Patent
Thurm

(10) Patent No.: US 7,258,362 B2
(45) Date of Patent: Aug. 21, 2007

(54) VERTICALLY STOWABLE MODULAR MULTI-PURPOSE TRAILER

(76) Inventor: Kenneth R. Thurm, 2348 N. Rockridge Cir., Orange, CA (US) 92867

( * ) Notice: Subject to any disclaimer, the term of this patent is extended or adjusted under 35 U.S.C. 154(b) by 0 days.

(21) Appl. No.: 11/297,494

(22) Filed: Dec. 8, 2005

(65) Prior Publication Data

US 2007/0001432 A1    Jan. 4, 2007

(51) Int. Cl.
    *B62B 1/00* (2006.01)
(52) U.S. Cl. .................................. 280/656; 280/491.1
(58) Field of Classification Search ............. 280/656, 280/651, 491.1, 789, 47.33, 401, 639; 414/483, 414/537, 480, 496; 296/57.1, 61
    See application file for complete search history.

(56) References Cited

U.S. PATENT DOCUMENTS

| | | |
|---|---|---|
| 2,229,653 A | 1/1941 | Hohl |
| 2,792,270 A | 5/1957 | Anderson |
| 3,025,985 A | 3/1962 | Crawford |
| 3,480,320 A | 11/1969 | Turner et al. |
| D219,964 S | 2/1971 | Ransom |
| 3,582,131 A | 6/1971 | Brown |
| D226,655 S | 4/1973 | Ezell |
| 3,817,556 A | 6/1974 | Nyman |
| 3,901,398 A * | 8/1975 | Bunch ................... 414/483 |
| 3,912,139 A | 10/1975 | Bowman |
| 4,032,167 A | 6/1977 | Chereda |
| D245,495 S | 8/1977 | Henderson |

(Continued)

FOREIGN PATENT DOCUMENTS

GB    2 044 193 A    10/1980

(Continued)

OTHER PUBLICATIONS

WWW.POWERSPORTSNETWORK.COM; 2001 Easy Hauler 5×8 Flat Bed; Oct. 8, 2003; 2 page classified ad.

(Continued)

*Primary Examiner*—Hau Phan
(74) *Attorney, Agent, or Firm*—Stetina Brunda Garred & Brucker

(57) ABSTRACT

A vertically stowable modular multi-purpose trailer is provided. The trailer includes a forward support section including a first tubular frame having a main body portion with a first upper platform and rear interface side, and forward trailer neck; a pair of caster wheels attached proximate said rear interface; and a first planar deck substantially covering the first upper platform. The trailer further includes a rear support section including a second tubular frame having a second upper platform and a forward interface; and a second planar deck substantially covering the second upper platform. A pair of hinge assemblies interconnecting rear interface and said forward interface. The trailer is adapted to be configured in a deployed configuration, wherein the forward support section and rear support section are longitudinally positioned next to each other forming a generally horizontally oriented common planar platform for supporting a payload. The trailer is further adapted to be configured in a vertically stowed configuration, wherein the forward support section and rear support section are adapted to be folded about the pair of hinge assemblies such that the forward support section and rear support section are latitudinally positioned next to each other in a generally vertical orientation.

21 Claims, 8 Drawing Sheets

U.S. PATENT DOCUMENTS

| | | | |
|---|---|---|---|
| 4,089,522 A | 5/1978 | Rock | |
| 4,126,324 A | 11/1978 | Browning | |
| 4,133,440 A | 1/1979 | Heidrick, Jr. | |
| D258,730 S | 3/1981 | Jenkins | |
| 4,362,316 A | 12/1982 | Wright | |
| 4,397,476 A | 8/1983 | Bolyard et al. | |
| 4,420,182 A | 12/1983 | Kaneshiro | |
| 4,480,851 A | 11/1984 | St-Pierre | |
| 4,488,735 A | 12/1984 | Hehr | |
| D278,615 S | 4/1985 | Law et al. | |
| 4,522,425 A | 6/1985 | Cornwall et al. | |
| 4,529,220 A | 7/1985 | Wright et al. | |
| 4,645,230 A | 2/1987 | Hammons | |
| 4,752,177 A | 6/1988 | Zenna | |
| 4,763,914 A | 8/1988 | Lemmons | |
| 4,768,806 A | 9/1988 | Tetreault | |
| 4,786,073 A | 11/1988 | Harper | |
| 4,792,274 A | 12/1988 | Cockram | |
| 4,822,069 A | 4/1989 | Burgess | |
| 4,824,133 A | 4/1989 | Wilson | |
| 4,901,980 A | 2/1990 | Hansen | |
| 5,033,931 A * | 7/1991 | Mann | 414/480 |
| 5,042,831 A | 8/1991 | Kuhns | |
| D336,869 S | 6/1993 | Leib et al. | |
| 5,228,712 A | 7/1993 | Speier | |
| 5,261,215 A | 11/1993 | Hartz et al. | |
| 5,326,128 A | 7/1994 | Cromley, Jr. | |
| 5,340,145 A | 8/1994 | Leib et al. | |
| 5,354,090 A | 10/1994 | Grovom | |
| 5,387,001 A | 2/1995 | Hull et al. | |
| 5,570,898 A | 11/1996 | Albert | |
| 5,607,176 A | 3/1997 | Leib et al. | |
| 5,810,378 A | 9/1998 | Brinkley | |
| 5,924,836 A | 7/1999 | Kelly | |
| 5,984,332 A | 11/1999 | Beaudoin et al. | |
| 6,010,145 A | 1/2000 | Liu | |
| 6,102,370 A | 8/2000 | Johnston | |
| 6,173,941 B1 | 1/2001 | Johnston | |
| 6,182,990 B1 | 2/2001 | Everett | |
| 6,428,035 B1 | 8/2002 | Maxwell et al. | |
| 6,536,367 B1 | 3/2003 | Carter | |
| 6,540,245 B1 | 4/2003 | Shankle et al. | |
| 6,557,882 B2 | 5/2003 | Harrington | |
| 6,612,389 B1 | 9/2003 | Bell | |
| 6,669,269 B1 | 12/2003 | Tran-Ngoc | |
| 6,773,025 B1 | 8/2004 | Zelm | |
| 6,846,003 B2 * | 1/2005 | Thompson | 280/656 |
| 6,863,481 B2 | 3/2005 | Pingel | |
| 6,955,375 B2 | 10/2005 | Thurm | |
| 7,004,495 B2 * | 2/2006 | Thurm | 280/656 |
| 7,055,848 B1 * | 6/2006 | James | 280/656 |
| 2005/0093273 A1 | 5/2005 | McDonnell | |

FOREIGN PATENT DOCUMENTS

| | | |
|---|---|---|
| GB | 2 175 547 A | 12/1986 |

OTHER PUBLICATIONS

WWW.PSNDEALER.COM; Photo of a trailer; Oct. 8, 2003; 1 page classified ad (2003 48 MCTD.jpg).
WWW.PSNDEALER.COM; Photo of a trailer, Oct. 8, 2003; 1 page classified ad (2003 48 MCT.jpg).
WWW.PSNDEALER.COM; Photo of a trailer, Oct. 8, 2003; 1 page classified ad (2003 48 Elite12.jpg).
WWW.PSNDEALER.COM; Photo of a trailer, Oct. 8, 2003; 1 page classified ad.
WWW.PSNDEALER.COM; Photo of a trailer, Oct. 8, 2003; 1 page classified ad (2003 48 SL12-2.jpg).
WWW.PSNDEALER.COM; Photo of a trailer; Oct. 8, 2003; 1 page classified ad (2003 48 SL8.jpg).
WWW.PSNDEALER.COM; Photo of a trailer, Oct. 8, 2003; 1 page classified ad (2003_48_GU10.jpg).
WWW.PSNDEALER.COM; Photo of a trailer, Oct. 8, 2003; 1 page classified ad (2003 48 UT10.jpg).
WWW.PSNDEALER.COM; Photo of a trailer, Oct. 8, 2003; 1 page classified ad (2003 48 UT12.jpg).
WWW.PSNDEALER.COM; Photo of a trailer, Oct. 8, 2003; 1 page classified ad (2003 48 AUT8W.jpg).
WWW.POWERSPORTSNETWORK.COM; Oct. 8, 2003; 1 page classified ad (2003_48_Elite16.jpg).
WWW.PSNDEALER.COM; Photo of a trailer, Oct. 8, 2003; 1 page classified ad (2003 48 UT88.jpg).
WWW.PSNDEALER.COM; Photo of a trailer, Oct. 8, 2003; 1 page classified ad (2003 48 UT128-2.jpg).
WWW.PSNDEALER.COM; Photo of a trailer, Oct. 8, 2003; 1 page classified ad (2003 48 XTV.jpg).
WWW.PSNDEALER.COM; Photo of a trailer; Oct. 8, 2003; 1 page classified ad (2003_48_Elite10.jpg).

* cited by examiner

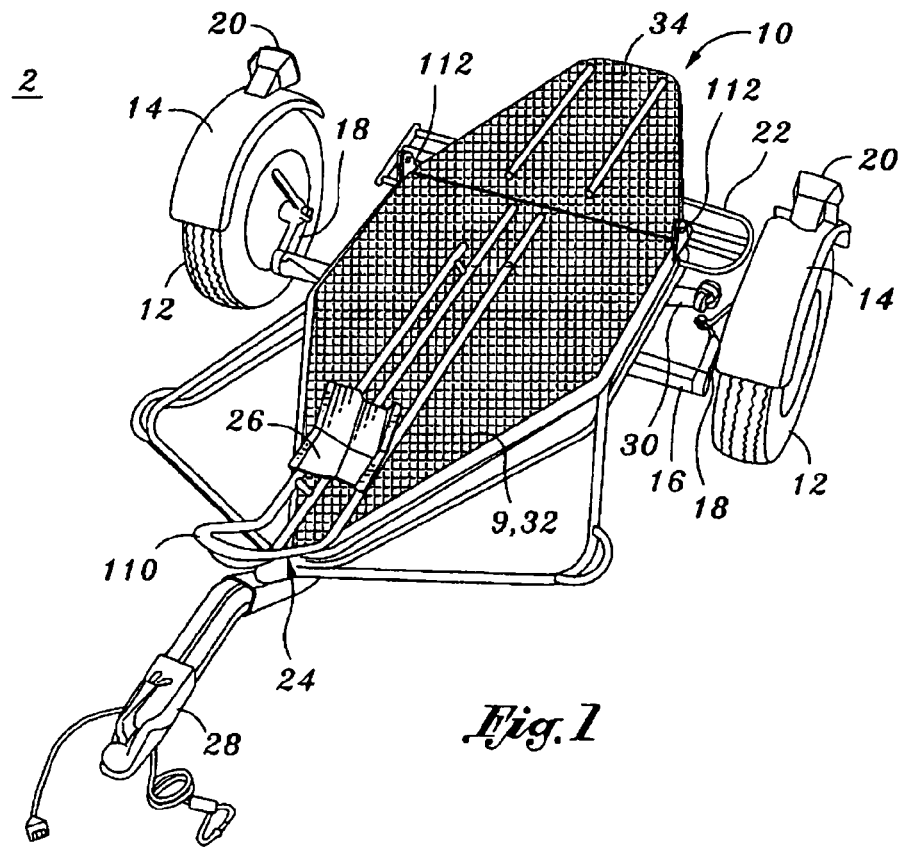
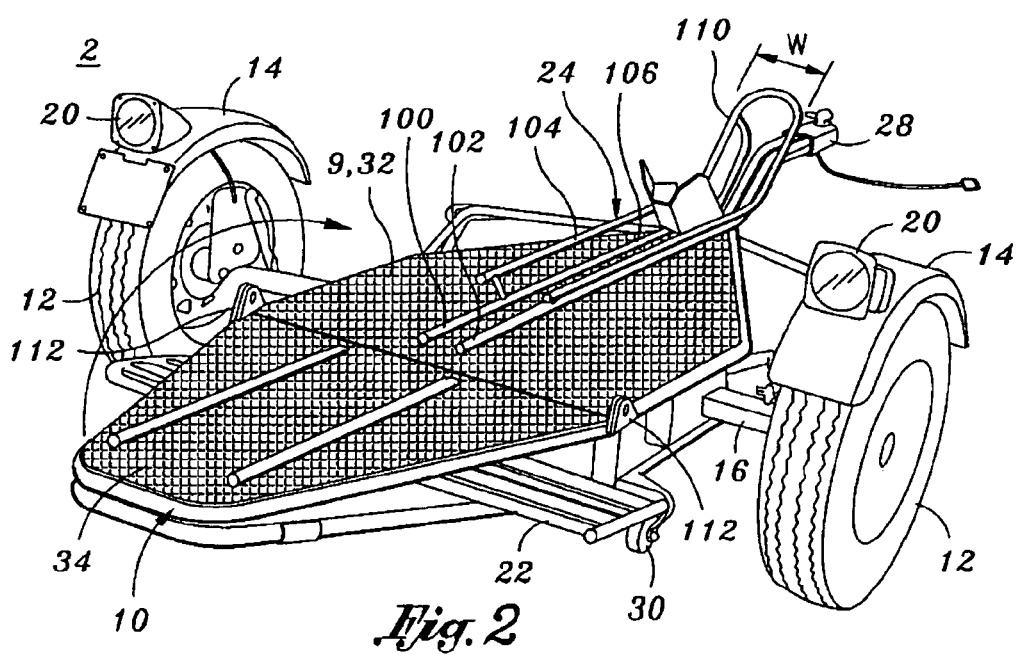

VERTICALLY STOWABLE MODULAR MULTI-PURPOSE TRAILER

CROSS-REFERENCE TO RELATED APPLICATIONS

The present application claims the benefit of Non-Provisional Application No. 10/713,697 under 35 U.S.C. §120 to Kenneth R. Thurm, filed on Nov. 14, 2003. the disclosure of which is expressly incorporated by reference herein in its entirety.

STATEMENT RE: FEDERALLY SPONSORED RESEARCH/DEVELOPMENT

Not Applicable

BACKGROUND OF THE INVENTION

1. Field of the Invention

The present invention relates to the field of multi-purpose trailers. In particular, the present invention relates to trailers designed to carry motorcycles, ATV's, golf carts, watercraft, lawnmowers, construction equipment, furniture, and wide variety of other cargo, devices or objects. Furthermore, the present invention relates to trailers which may be folded or collapsed into a stowable package and stored in a compact vertically upright manner.

2. Background of the Invention

As the popularity of motorcycles, ATV's and small watercraft proliferates, the demand for more practical, versatile and sophisticated motorsports trailers also increases. There are currently many different types and models of motorcycle and ATV trailers available on the market today which are generally satisfactory products; however, many consumers desire improved and innovative designs over the traditional motorcycle and/or ATV trailer. Some of the various prior art trailers utilized to haul motorcycles and ATVs are now herein described below.

One of the longest standing motorcycle and ATV trailer designs has evolved from the basic utility trailer design that has been utilized for decades. This type of trailer utilizes a large flat rectangular bed. Features of this design may include removable side rails and on/off loading ramps hinged to the rear of the rectangular bed. Although this basic design has proven to be very reliable and functional over the years, it does have disadvantages. For instance, the flat rectangular bed is not designed to be easily stowed. Since the rectangular bed is typically a rigid body constructed with a frame of metal beams and the floor of the bed being either covered in diamond plate or wooden planks, the bed cannot be collapsed or folded. As a result, when the trailer is not being used, it still is deployed in its normal configuration. This means valuable storage space, garage space, driveway space, yard space, or the like is consumed. Another disadvantage of the rectangular bed design is that it is typically inherently heavy due to its heavy-duty frame construction. Thus, in most situations, these traditional styled trailers are under utilized in regard to capacity. For instance, a trailer that was once originally designed to haul heavy-duty farm equipment such as tractors, has a much greater hauling capacity than what is required to haul a couple motorcycles or an ATV. Furthermore, the flat rectangular bed design does not offer special features adapted explicitly to secure motorcycles.

Another example of an existing trailer is a smaller lighter weight frame design which is specifically configured for transporting motorcycles. An example of this design is disclosed in U.S. Design Pat. No. 336,869. This design includes a trailer frame that is typically constructed from square or rectangular tube or beams. Either one, two or three channel rails are placed atop the frame the for accepting the motorcycle tires. Although these designs are lighter weight and easier to maneuver, they do have some drawbacks. For instance, since the trailer does not typically have planar decking, it can only be used to transport motorcycles and is not capable of transporting ATV's. Also, since this design does not have planar decking, storage space for auxiliary equipment is not available. And even though this design is more compact, it still takes up substantially more space than is required, since it typically is not designed to be collapsed or stored vertically. And since the aforementioned designed is optimized for transporting motorcycles, the trailer is otherwise not very useful when other cargo needs to be transported such as furniture. Thus, this design lacks flexibility that is desired by many consumers.

A third variety of design is a design similar to the previous design, but additionally is designed to be stored in a vertical position. An example of this trailer is disclosed in U.S. Pat. No. 5,340,145 to Leib et al. entitled "Collapsible Trailer". In particular, a collapsible trailer is provided which includes a first and second platform which is pivotally mounted to the first platform so that the second platform may move between an open and closed position. A support arm is mounted on the first platform and extends to contact the second platform at a position substantially away from the pivot axis of the second platform when in the open position. This design exhibits very desirable features such as the ability to be stored in a vertical upright position and a compact easily maneuverable design. However, this design has the same drawbacks as the previous designs, in particular, it is dedicated to only one purpose for transporting motorcycles. Moreover, this design lacks planar decking.

Thus, one of the overall primary disadvantages of the aforementioned designs is that the prior art trailers are either designed with a specific task in mind (e.g., transporting motorcycles) or designed with a very general task in mind, such as basic utility. That is to say, a trailer may be designed to accomplish a specific task, such as hauling motorcycles, yet the trailer cannot be converted into a general purpose utility trailer. Or perhaps the trailer is general purpose built and lacks components/design features (such as wheel guides and chock) which are provided on trailers designed to accomplish a specific task such as hauling a watercraft, motorcycle or ATV. With these disadvantages in mind, it would be desirable to provide a trailer which has a multi-purpose role, in particular, the ability to be adapted from a specific mission to a more general mission.

Furthermore, none of the aforementioned designs take advantage of state-of-the-art manufacturing processes which consumers have shown a strong preference for and of which manufacturers desire to implement to reduce fabrication costs. For instance, round tubular steel double frame construction has been shown to be lighter than traditional rectangular and square tubing frame designs, while still exhibiting the same structural strength. The ability to manufacture bent tube frame economically opens up the opportunity to incorporate a variety of frame design improvements that are difficult or very costly to achieve with square or rectangular tubing which does not lend itself well to being bent.

Other features of which none of the aforementioned designs incorporate is the concept of modularity. By utilizing similar sub-components in various models of trailers, overall costs of manufacturing the various trailers may be reduced, and thus, the savings may be passed to the consumer.

It would be advantageous to provide a motorsports trailer that overcomes the aforementioned disadvantages that the prior art trailers exhibit. In particular, it would be advantageous to develop a line of multi-purpose motorcycle and/or ATV trailers based upon a modular concept in which similar components, designs, features, parts, etc. may be shared within each embodiment. It would be further advantageous to utilize high-strength light weight steel double frame construction designs which have been shown to be lighter and as strong as traditional square tubing or rectangular tubing frames. It is also desirable to package the aforementioned tubular frames in a design which may be stowed in a vertically upright position.

BRIEF SUMMARY OF THE INVENTION

The aforementioned disadvantages are overcome by providing a vertically stowable modular multi-purpose trailer. The trailer includes a forward support section including a first tubular frame having a main body portion with a first upper platform and rear interface side, and forward trailer neck; a pair of caster wheels attached proximate the rear interface; and a first planar deck substantially covering the first upper platform. The trailer further includes a rear support section including a second tubular frame having a second upper platform and a forward interface; and a second planar deck substantially covering the second upper platform. A pair of hinge assemblies interconnecting the rear interface and the forward interface. The trailer is adapted to be configured in a deployed configuration, wherein the forward support section and rear support section are longitudinally positioned next to each other forming a generally horizontally oriented common planar platform for supporting a payload. The trailer is further adapted to be configured in a vertically stowed configuration, wherein the forward support section and rear support section are adapted to be folded about the pair of hinge assemblies such that the forward support section and rear support section are latitudinally positioned next to each other in a generally vertical orientation.

According to another aspect of the present invention, when the trailer is vertically stowed, the pair of caster wheels are in contact with a ground surface. According to another aspect of the present invention, when the trailer is deployed, the pair of caster wheels are elevated from the ground. Another aspect of the present invention includes the main body having a recess underneath the first upper platform adapted to store a spare wheel and tire. A further aspect of the present invention includes the trailer being configured to transport a single motorcycle or configured to transport a plurality of motorcycles.

According to another aspect of the present invention, the trailer further comprises at least one motorcycle guide rail and wheel chock assembly removably attached to the first upper platform. Moreover, another aspect of the present invention includes at least one loading ramp adapted to be stored within the rear support section, wherein one end of the at least one loading ramp may be attached to a rear end of the rear support section and the other end is positioned to engage the ground.

A further aspect of the present invention includes the first and second tubular frames formed from round steel tube. Additionally, the trailer includes an axle attached to the main body portion, an independent torsion suspension system attached to the axle, and a pair of wheels and tires rotatably attached to the suspension system. Also, the present invention may include a spare tire stored within the recess. According to another aspect of the present invention, the trailer further includes a trailer hitch attached to the forward trailer neck. Another aspect of the present invention may include attaching a modular removable stone guard positioned in a forward region of said forward support section. Another aspect of the present invention may also include at least one utility box fastened to the first upper platform of the forward support section.

Moreover, when the trailer is deployed and the at least one motorcycle guide rail and wheel chock assembly is removed, the generally horizontally oriented common planar platform provides a flat bed platform of about 5'×7'. And another aspect of the present invention includes a plurality of grating panels attached to the first and second platforms, said grating panels laterally positioned outboard of the first and second planar deck.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 1 is a frontside overhead perspective view of a first exemplary embodiment of a vertically stowable modular trailer configured for one motorcycle;

FIG. 2 is a backside perspective rear view of the first embodiment of the vertically stowable modular trailer configured for one motorcycle;

FIG. 11 is a rear perspective view of the second embodiment converted into a flatbed configuration for transporting an ATV golf cart or the like.

DETAILED DESCRIPTION OF THE INVENTION

Figure 3A:
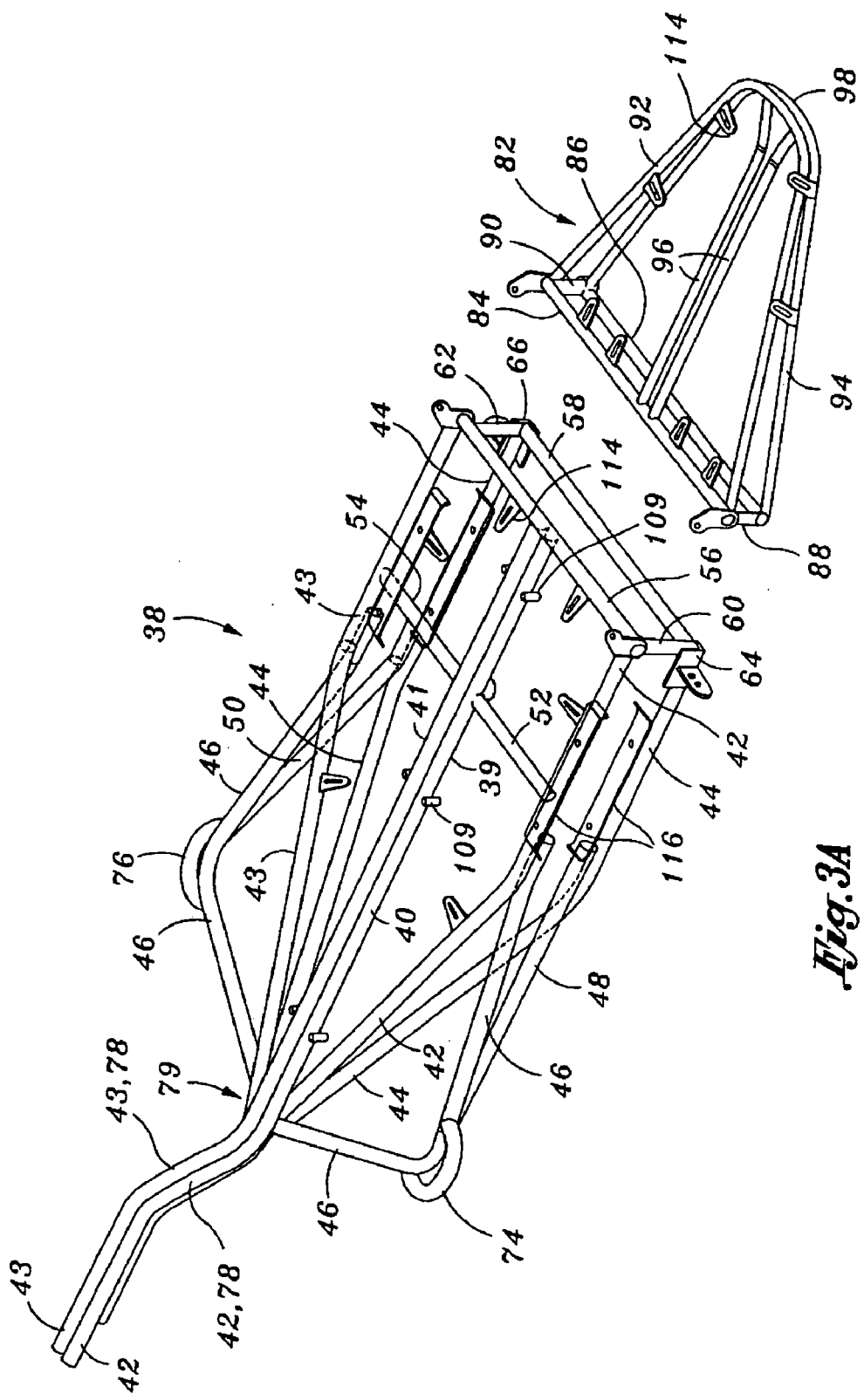
FIG. 3A is a perspective view of the frame of the first embodiment, according to an aspect of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIRST EXEMPLARY EMBODIMENT OF THE VERTICALLY STOWABLE MODULAR TRAILER FOR ONE MOTORCYCLE

Overview of the First Exemplary Embodiment

FIGS. 1 through 5 illustrate a first exemplary embodiment of the vertically stowable modular trailer 2 configured to transport one motorcycle. Modular trailer 2 is dual-purpose built such that it may also be configured into a flatbed trailer. Modular trailer 2 has a deployed configuration (see FIGS. 1 and 2) and a folded, stowable non-deployed configuration which allows the modular trailer 2 to be stored in a vertical upright position (see FIGS. 4 and 5). Additionally, the trailer 2 may utilize a removable and stowable loading ramp 22 (similar to ramps shown in FIG. 11). A preferred embodiment of the stowable modular trailer 2 may have a weight of about 250 lbs., capacity of about 1000 lbs., deck area of about 35"×76", standing height of about 89", width of about 72", depth of about 27", and length of about 120".

Modular trailer 2 utilizes a foldable platform configuration including a forward support section 9 and foldable rear support section 10. Both the forward support section 9 and foldable rear support section 10 preferably are fabricated from round tube steel double frame construction. The modular trailer 2 also includes removable motorcycle rails 24 with a wheel chock 26, stowable loading ramp 22, casters 30 for vertical storage, diamond plate decking 32, 34, an independent torsion suspension 16, 18, wheels and fenders 12, 14, stowable spare tire 36 and trailer hitch 28. The trailer may also utilize a modular utility box and stoneguard as optical accessories.

The aforementioned components and other features of the first exemplary embodiment of the stowable modular trailer 2 configured to transport one motorcycle will first be described in the specification. The integration of the components and functionality of the trailer 2 will then be explained.

Forward Support Section of the First Exemplary Embodiment

Forward support section 9 is structurally based upon a forward tubular frame 38 as illustrated in FIG. 3. The frame 38 preferably comprises a round tube steel double frame construction. The tubing material may vary with regard to strength, weight and dimension (e.g., diameter and thickness) depending on the specified capacity of the trailer. For instance, the tubing may be a high-strength steel alloy for heavy-duty trailer construction or a lightweight high-strength aluminum alloy for a light weight build.

Forward tubular frame 38 preferably includes a main center support 40 which may be comprised of a left and right main tubular members 39, 41. Main center support 40 acts as the backbone of the forward tubular frame 38, extending from the most rearward end of the frame 38 through the entire frame body, and further forming the trailer neck 78. A rear upper crossmember 56 is attached in a perpendicular transverse manner to the main center support 40 to form the rear end of the forward tubular frame 38. The frame 38 has a forward main body portion in which an A-frame is formed having an apex 79 which defines the front side of the main body portion of the frame 38 and the beginning of the trailer neck 78. Just past the apex 79, the main center support 40 has an upwardly inclined portion and another level portion adapted to receive trailer hitch 28.

An upper left main support 42 is connected to the left distal end of the crossmember 56. The upper left main support 42 runs the entire length of the body tubular frame 38. The left main support 42 has a first straight portion (towards the rear of the frame) that is laterally offset from the main center support 40 and parallel thereto. A second portion of left main support 42 is angled inwards towards the apex 69 and is connected to the left main tubular member 39 of the main center support 40 at apex 69. Thus, the second portion defines the leftside of the A-frame structure which has apex 79 as the most forward end of the body of the frame 38.

In a mirror image to the upper left main support 42, an upper right main support 43 is connected to the right distal end of the crossmember 56. The upper right main support 43 may run the entire length of the main body of tubular frame 38. The right main support 43 has a first straight portion (towards the rear of the frame) that is laterally offset from the main center support 40 and parallel thereto. A second portion of right main support 43 is angled inward towards the apex 79 and attached to the right main tubular member 41 of the main center support 40 at apex 79. The second portion defines an upper rightside of an A-frame structure which defined apex 79 at the most forward end of the main body of tubular frame 38.

A left middle crossmember 52 is positioned upward from the rear upper crossmember 56 about one third the frame's 38 length (excluding the trailer neck 78), such that it interconnects the first portion of the left main support 42 to the left main tubular member 39 of the main center support 40. Similarly, a right middle crossmember 54 is positioned upward from the rear upper crossmember 56 at a same distance as the left middle crossmember, such that the right middle crossmember 54 interconnects the first portion of the right main support 43 to the right main tubular member 41 of the main center support 40. Together, main center support 40, left and right main support 42, 43, rear upper crossmember 56, and left and right middle crossmembers 52, 54, define a plane and mounting surface to which decking 32 is attached.

A lower portion of the forward tubular frame 38 is formed by attaching a left vertical member 60 down from the left distal end of the rear upper crossmember 56, attaching a right vertical member 62 down from the right distal end of crossmember 56, and tying the left and right vertical members 60, 62 together with a rear lower crossmember 58. A lower A-shaped member 44 may then be attached to the most downward distal ends of the left and right vertical members 60, 62. The lower A-shaped member 44 has a first portion which is downwardly offset and parallel to the first portion of the left main support 40. A second portion of the lower A-shaped member 44 is angled in and upwards toward the apex 79 region proximate the main center support 40 such that the second portion of the lower A-shaped member 44 is directly beneath the inwardly angled portion of the left main support 42. On the rightside of the frame 38, the lower A-shaped member 44 has a fourth portion which is downwardly offset and parallel to the first portion of the right main support 43. A third portion of the lower A-shaped member 44 is angled in and upwards toward the apex 79 region proximate the main center support 40 such that the third portion of the lower A-shaped member is directly beneath the second portion of the right main support 43. Both the second portion and third portion of the A-shaped member 44 may be connected together by an arch to further form another portion of the apex 79 of the A-frame which is considered to be the most forward body portion of frame 38. It is preferred that all four portions of the A-shaped member 44 are formed from one unitarily bent tube.

Additionally, a four-sided forward perimeter member 46 is positioned just in front of the apex 79 of the A-frame of the frame 38. In particular, a first portion of perimeter member 46 is attached to the left main support 42 at the inward bend between the first and second portion of the left main support 42. The first portion of perimeter member 46 is flared outwardly left at an angle of about 30 degrees from the side of the frame 38 defined by the left main support 42. At about halfway up the length of the A-frame, a second portion of perimeter member 46 bends back inward towards the A-frame apex 79 and is connected to the apex 79 region. Similarly on the right side of the frame 38, a fourth portion of perimeter member 46 is attached to the right main support 43 at the inward bend between the first and second portion of the right main support 43. The fourth portion of perimeter member 46 is flared outwardly right at an angle of about 30 degrees from the side of the frame 38 defined by the right main support 43. At about halfway up the length of the A-frame, the third portion of the perimeter member 46 bends back inward towards the A-frame apex 79 is connected to the second portion of the perimeter member 46 via a continuous arch. Thus, it is preferred that perimeter member 46 is formed from one continuous tube, forming a perimeter about the A-frame. It is observed that perimeter member 46 appears to have a shape of a pentagon lacking one side.

Furthermore, as shown in FIG. 3A, left and right strengthening elbows 74, 76 are provided at the inwardly bent joint between the first and second portion of perimeter member 46 and at the inwardly bent joint between the third and fourth portion of perimeter member 46.

Additionally, a left forward connecting strut 48 is attached to the bend between the first and second portion of the A-shaped member 44 and the left strengthening elbow 74. Similarly, a right forward connecting strut 50 is attached to the bend between the third and fourth portions of the A-shaped member 44 and the right strengthening elbow 74.

The trailer neck 78 comprises three tubes including the most forward portions of the left and right main tubular members 39, 41 from the main center support 40 and a lower trailer neck tube 72. As already discussed, just past the apex 79, the main center support 40 has an upwardly bent portion and another portion adapted to receive trailer hitch 38 which is bent level such that it is parallel and upwardly offset from the portion of the main center support 40 which forms the backbone of the body of the tubular frame 38. Furthermore, the lower trailer neck tube 72 is positioned underneath and in the seam formed by the left and right main tubular members 39, 41 of the main center support 40, and follows the bending contour of the neck 78 from the apex 79 region to the distal end of the neck. As is seen in FIGS. 1, 2, 5 and 6, a standard trailer hitch 28 assembly is preferably attached to the distal end of the trailer neck 78. Preferably, trailer hitch 28 is adapted to receive a ball. The trailer hitch 28 is a component well known in the art, and therefore, is not described in any further detail.

Foldable Rear Support Section of the First Exemplary Embodiment

Foldable rear support section 10 primarily includes a rear tubular frame 82 as illustrated in FIG. 3. The rear frame 82 preferably comprises a round tube steel double frame construction similar to the forward frame 38. The tubing material may vary with regard to strength, weight and dimension (e.g., diameter and thickness) depending on the specified capacity of the trailer. For instance, the tubing may be a high strength steel alloy for heavy duty trailer construction or a lightweight high strength aluminum alloy for a light weight build.

Rear tubular frame 82 preferably includes an upper crossmember 84 and a lower crossmember 86 oriented in the same direction as the upper and lower rear crossmembers 56, 58 from the forward tubular frame 38, so that a foldable interface may be defined. The foldable interface will be discussed in greater detail later in the specification. In particular, upper crossmember 84 is positioned directly above and in parallel with lower crossmember 86. An upper flared out U-shaped support 92 having a leftside attach point and right side attach point that are attached to the left and right distal end of the upper crossmember 84, respectively. Thus, a plane is defined by the upper crossmember 84 and upper U-shaped support 92 which provides the supporting surface for the rear decking 34. Also, a lower flared out U-shaped support 94 having a leftside attach point and right side attach point is attached to the left and right distal end of the lower crossmember 86, respectively. The arched portions of the upper and lower U-shaped supports 92, 94 are connected together in a parallel manner to form a rear frame tip portion 98. It is noted that the lower U-shaped support 94 is oriented in an upward angle towards the rear frame tip portion 98 as compared to the upper U-shaped support 92 which is oriented in a generally level horizontal plane. Additionally, a pair of center struts 96 are positioned normal to and attached at the center of upper crossmember 84. The other ends of the pair of center struts 96 are attached to the inside surface of the upper U-shaped support 94 proximate the rear frame tip portion 98. The pair of center struts 96 are provided to support the wheels of a motorcycle during loading and unloading.

Integration of Forward Support Section, Foldable Rear Support Section, Axle, Suspension, Wheels and Casters of the First Embodiment The following paragraphs describe how the forward support section 9, foldable rear support section 10, decking 32, 34, straight axle 16, independent torsion suspension 18, wheels and tires 12, stowable spare tire 36, caster wheel assemblies 30 and other components of the stowable modular trailer 2 are interconnected to and integrated with each other.

Figure 5:
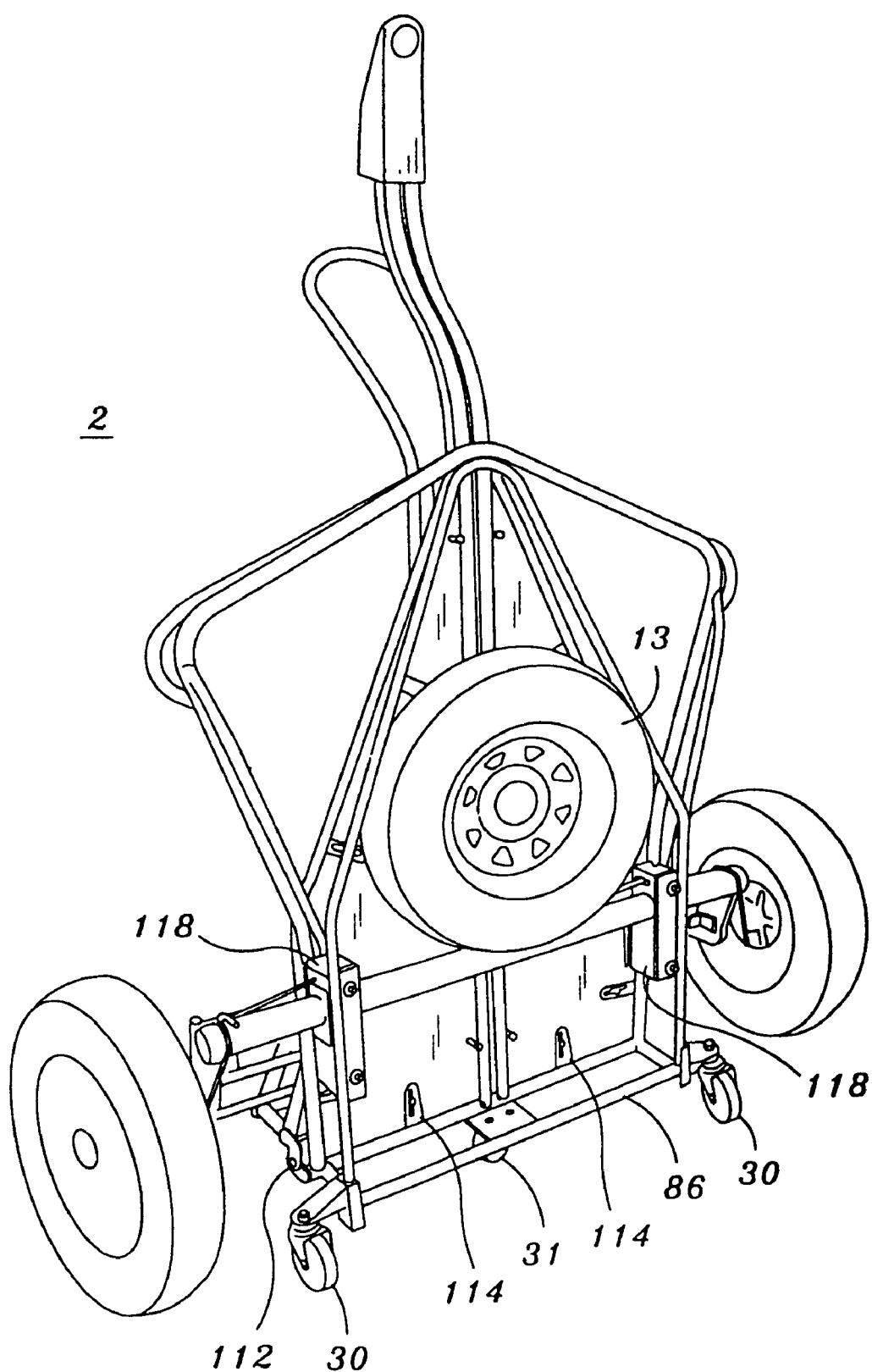
FIG. 5 is a rear perspective view of the first embodiment depicting the trailer in a vertically stowed upright position, according to an aspect of the present invention.

Preferably diamond plate is utilized as the forward decking 32 which is attached to the upper surfaces of the forward support section 9. Also, diamond plate may be utilized as the rear decking 34 which is attached to the upper surfaces of the foldable rear support 10 section. Moreover, any other type of plate material known in the art may utilized. As best shown in FIGS. 3A and 5, a plurality of mounting tabs 114 are provided on various regions of the upper portions of the main body of tubular frame 38 and rear tubular frame 82. The plurality of mounting tabs 114 are utilized to fasten the forward decking 32 to the upper portion of tubular frame 38 and to fasten the rear decking 34 to the upper portion of rear tubular frame 82.

Forward support section 9 and foldable rear support section 10 are rotatably attached via hinge assemblies 112 (see FIGS. 1, 2 and 5) to form a foldable interface. As a result, a hinged joint is formed between forward support section 9 and foldable rear support section 10. Thus, when trailer 2 is fully deployed (as shown in FIGS. 1 and 2), the horizontal plane defined by forward support section 9 is coincident with the horizontal plane defined by rear support section 10, thereby creating a continuous platform. However, when the trailer 2 is not in use, rear support section 10 may be folded about the axis defined by the pair of hinge assemblies 112 (see FIGS. 4 and 5) and positioned either on top or vertically next to forward support section 9.

The stowable modular trailer 2 has an independent torsion suspension system which includes straight axle 16, left and right torsion suspension components 18, suspension brackets 118, and suspension receiving brackets 116. An exemplary independent torsion suspension system utilized in the present invention is a "TORFLEX" suspension system. This system is a torsion type suspension, which is at least partially self-contained within the straight axle 16. Straight axle 16 may be attached directly to the body of frame 38 using suspension brackets 118; which are an integral part of the straight axle assembly 16. A pair of upper and lower suspension receiving brackets 116 are positioned on the tubular frame 38 to receive suspension mounting brackets 118 which are rigidly attached to straight axle 16 (see FIG. 3A). Each pair of brackets 116 are positioned on the left side and right side of the body of the frame 38. In particular an upper bracket 116 is attached to the first portion of the left main support 42 and a lower bracket 116 is attached to the first portion of the lower A-shaped member 44. Similarly, an upper bracket 116 is attached to the first portion of the right main support 43 and a lower bracket 116 is attached to the fourth portion of the lower A-shaped member 44. The straight axle 16, which has a pair of suspension mounting brackets 118, is then received in the lower suspension receiving brackets 116. Compared to a conventional leaf spring system, the TORFLEX suspension system provides superior suspension characteristics through the unique arrangement of a steel bar surrounded by four natural rubber cords, encased in the main structural member of the axle straight 116. A wheel hub spindle is attached to a torsion arm, which is fastened to the rubber-encased bar. As load is applied, the bar rotates causing a rolling compressive resistance in the rubber cords. This action provides the same functions as a conventional leaf spring axle with the added advantage on independent suspension.

Other components of the stowable modular trailer 2 include wheels and tires 12, fenders 14 and tail lights 20 which are also well known in the art, and therefore, not described in any further detail. FIG. 5, clearly depicts that the under body of the tubular frame 38 is designed such that a spare tire and wheel 13 may be stored in a recessed area between the straight axle 16 and the A-shaped member 44. Another feature of the trailer 2 is the strategic placement of a pair of caster assemblies 30 on the underside of frame 38 at the most rearward and lower end of the frame 38. In particular, a left caster assembly 30 is attached to the corner where left vertical member 60 and the rear lower crossmember 58 intersect to form a corner joint. Similarly, a right caster assembly 30 is attached to the corner where right vertical member 62 and the rear lower crossmember 58 intersect to form a corner joint. Additionally, a third caster wheel 31 may be attached to the lower forward crossmember 86 of the foldable rear support section 10. Moreover, a securing member 15 (see FIG. 4) is provided on the trailer 2 to secure the foldable rear support section 10 to the forward support section 9.

Figure 3B:
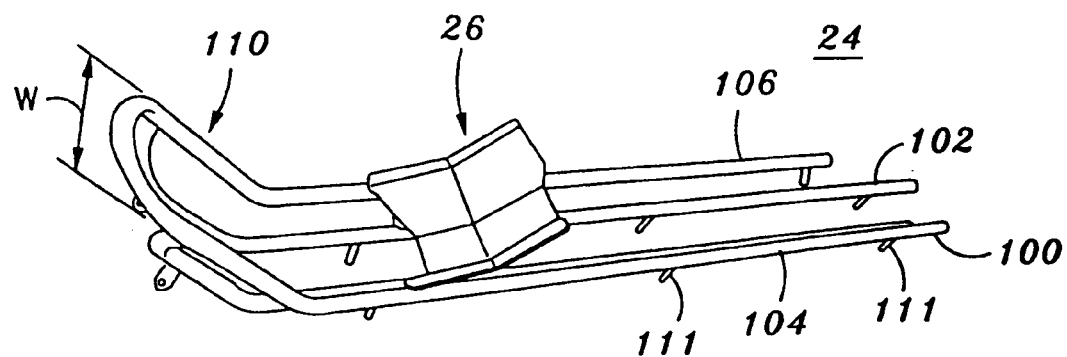
FIG. 3B is a perspective view of a removable motorcycle guide rail assembly.

Removable Motorcycle Guide Rail and Wheel Chock of the First Exemplary Embodiment The modular trailer 2 may include a removable motorcycle guide rail 24 and wheel chock 26 as best illustrated in FIG. 3B. Guide rail 24 is adapted to receive at least one of the front and rear wheel of a motorcycle. When installed onto the forward support section 9, guide rail 24 is in a substantially horizontal position atop forward decking 32. As shown in FIGS. 1, 2, and 3B guide rail 24 has a width W which is adapted to receive a motorcycle tire. It is noted that width W may vary with respect to differing embodiments of the present invention. For instance, the width of a rear tire of a custom motorcycle may be substantially greater than the width of a rear tire for a production motorcycle. Therefore, various modular embodiments of the removable guide rail 24 may be provided which are configured for motorcycles having tires within specific ranges of tires widths W. Because the guide rail 24 and wheel chock 26 are removable, the modular trailer 2 is able to convert to a flat bed platform. Thus, this is another modular aspect which adds versatility to the present invention.

FIG. 3B shows the modular guide rail 24 comprising a lower left support member 100, lower right support member 102 an upper left support member 104 and upper right support member 106, all of which are longitudinally oriented and positioned parallel with respect to each other. Lower support members 104, 106 are positioned laterally next to each other in a same horizontal plane. Similarly, upper members 100, 102 are positioned laterally next to each other and in another horizontal plane; however, upper members 100, 102 are positioned above lower support members 104, 106 and are spread wider apart than lower support members 104, 106. Lower support members 104, 106 and upper members 100, 102 are preferably, made from light weight high-strength metal tubing, for example, a steel alloy or a high-strength aluminum. The diameters of lower support members 104, 106 and upper members 100, 102 are preferably equivalent to or less than the diameters of forward tubular frame 38 and rear tubular frame 82.

Guide rail struts 108 are utilized to interconnect lower support members 104, 106 to upper members 100,102. As a result, a u-shaped channel (as viewed from a cross-sectional perspective) is provided which is adapted to receive at least one of the front and rear tire of a motorcycle when the motorcycle is positioned inside the guide rail 24. A forward tire cradle 110 is provided on the forward end of guide rail 24. Tire cradle 110 is formed by bending lower support members 104, 106, and upper support members 100, 102 upward. As best illustrated in FIGS. 1, 2, and 3B, upper support members 100, 102 are connected together forming cradle arch portion 110 and lower members 104, 106 are bent such that they are connected to upper support members 100, 102 at a position before the formation of arched tip of the forward tire cradle. Thus, preferably upper support members 100, 102 may be formed from one unitary tube. Similarly, lower members 104, 106 may also be formed from one unitary tube.

A wheel chock 26 is attached to guide rail 24 which is utilized to ensure that the tire loaded into the forward tire cradle 110 is properly supported. Wheel chock 26 has a general triangular shape which is adapted to conform to the curvature of a motorcycle wheel. Wheel chock 26 is rotatably mounted with a bracket structure such that chock 26 will automatically accept the entering wheel, and furthermore, flip over to support the back of the tire when the tire is rolled over chock 26. The wheel chock 26 is open when the rear section of the wheel chock 26 is down so that the motorcycle can be wheeled into place on the guide rail 24. The wheel chock is closed when the motorcycle front wheel is fully engaged in the wheel chock 26 and the front of the wheel chock 26 is lying down flat against the guide rail 24. A feature of the wheel chock 26 is that it is capable of holding the motorcycle in an upright position without the assistance of any other bracing member, kickstand, or tie-downs. Once the motorcycle is correctly secured in the wheel chock 26, the motorcycle will stand by itself. Thus, there is no need to hold the motorcycle upright. For additional safety measures, tie down straps, preferably ratchet-style tie down straps, may be also used to secure the motorcycle to the trailer.

It is further noted that a plurality of downwardly oriented attachment rods 111 are connected to the bottom of the lower members 104, 106. The attachment rods 111 are adapted to be fastened within respective rod fastener sleeves 109 (see FIG. 3A) which are positioned along the left and right main tubular members 39, 41 of main support 40. Preferably rod fastener sleeves 109 are quick-disconnects which allow easy installation and removal of the guide rail 24.

Stowable Loading Ramp of the First Embodiment

Figure 4:
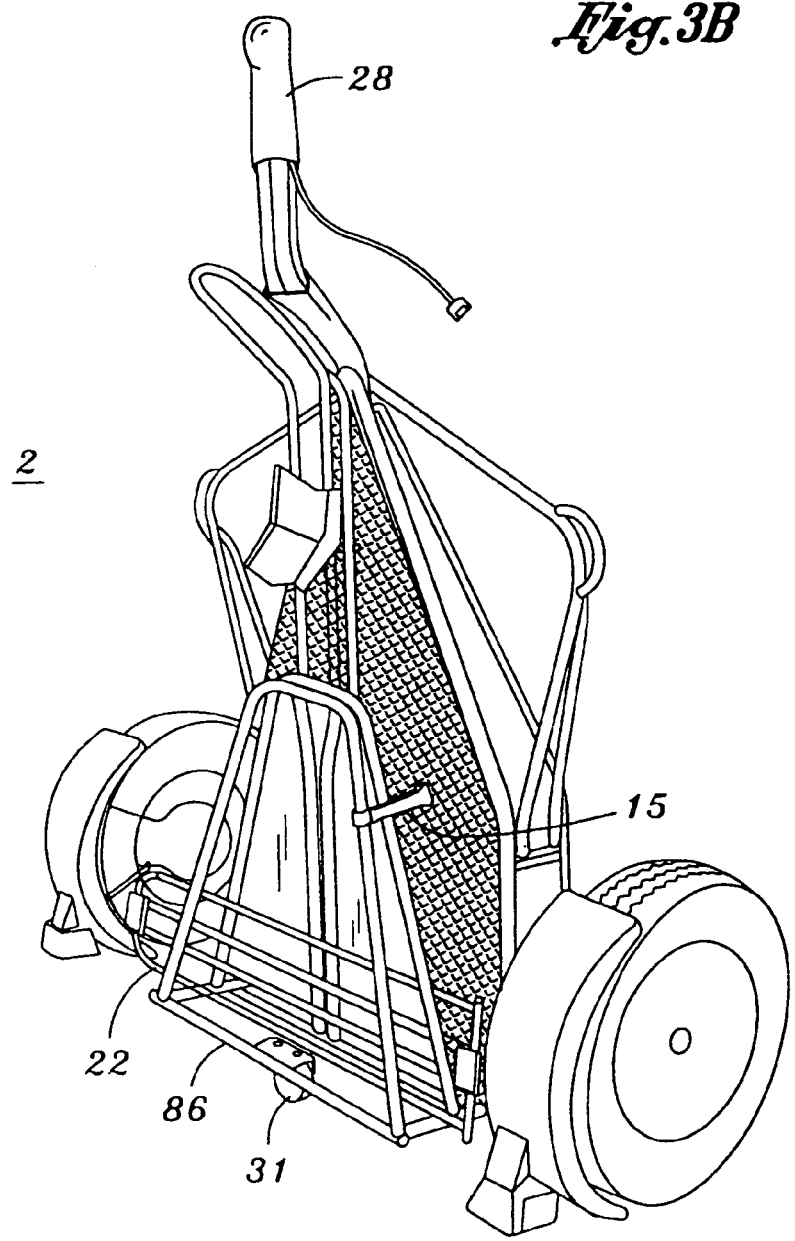
FIG. 4 is a front perspective view of the first embodiment depicting the trailer in a vertically stowed upright position, according to an aspect of the present invention.
Figure 11:
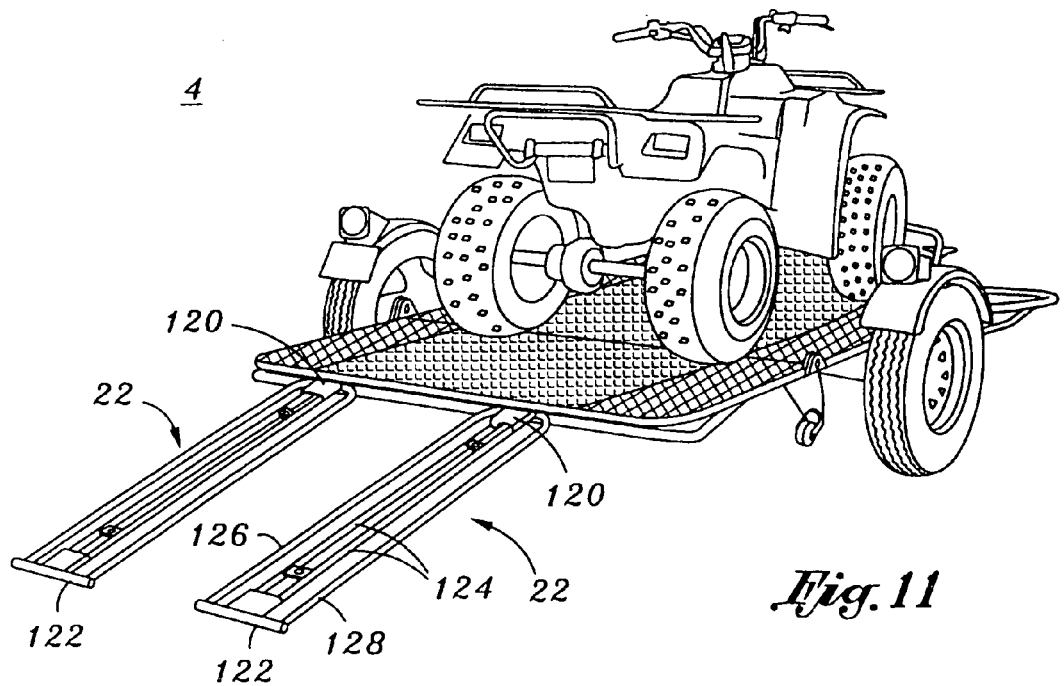

The modular trailer 2 may utilize a stowable loading ramp 22, such as is depicted as being deployed in FIG. 11 (second embodiment) and which is shown in a stowable position in FIGS. 1, 2 and 4. For the first embodiment, only one ramp 22 is required to load a motorcycle. Ramp 22 is adapted for loading and offloading both motorcycles and ATV vehicles if required. In particular, ramp 22 includes a pair of inner parallel rails 124 and a lower transverse rail 122 attached to the lower end of the pair of inner rails 124. Also, a left 126 and right 128 rail are laterally positioned to the sides of the inner rails 124, thus forming a longitudinally rectangular shaped ramp 22. On the upper side of the ramp 22, the upper ends of the left and right rail 126, 128 may be arched and connected together to from one continuous tube. Thus, left and right rails 126, 128 may actually be formed from one continuous tube. An attaching feature 120 is further incorporated on the upper attaching end of ramp 22 to secure and attach the upper end of the ramp 22 to the rear frame tip portion 98 of the foldable rear support section 10. An exemplary attaching feature 120 may be formed as a ramp hook.

SECOND EXEMPLARY EMBODIMENT OF THE STOWABLE MODULAR TRAILER FOR TWO MOTORCYCLES

Overview of the Second Exemplary Embodiment

FIGS. 6 through 11 illustrate a second exemplary embodiment of the vertically stowable modular trailer 4 configured to transport two motorcycles. Modular trailer 4 is multi-purpose built such that it may also be configured into a flatbed utility trailer. In the flatbed configuration, modular trailer 4 is capable of carrying general cargo (see FIG. 10), one or two ATV's (see FIG. 11) or other vehicles such as golf carts, riding lawnmowers and small farm tractors. Modular trailer 4 has a deployed configuration (see FIGS. 6 and 7) and a folded, stowable non-deployed configuration which allows the modular trailer 4 to be stored in a vertical upright position (see FIGS. 8 and 9). Additionally, the second embodiment may utilize a pair of removable and stowable loading ramps 22 (see FIG. 11). A preferred embodiment of the second embodiment of the stowable modular trailer 4 may have a weight of about 350 lbs., capacity of about 2000 lbs., deck area of about 5'×7', standing height of about 90", width of about 84", depth of about 27", and length of about 120".

Modular trailer 4 utilizes a foldable platform configuration, similar to that of the first embodiment, including a forward support section 209 and foldable rear support section 210. Both the forward support section 209 and foldable rear support section 210 preferably have a round tube steel double frame construction. The modular trailer 4 also includes a pair removable motorcycle rails 24 each having a wheel chock 26, caster assemblies 30 for vertical storage, diamond plate decking 232, 234, grating panels 280, an independent torsion suspension 16, 18, wheels and fenders 12, 14, stowable spare tire 36, trailer hitch 28 and other features.

The aforementioned components and other features of the second exemplary embodiment of the vertically stowable modular trailer 4 configured to transport two motorcycles will now be described in further detail in the specification.

Forward Support Section of the Second Exemplary Embodiment

Figure 9:
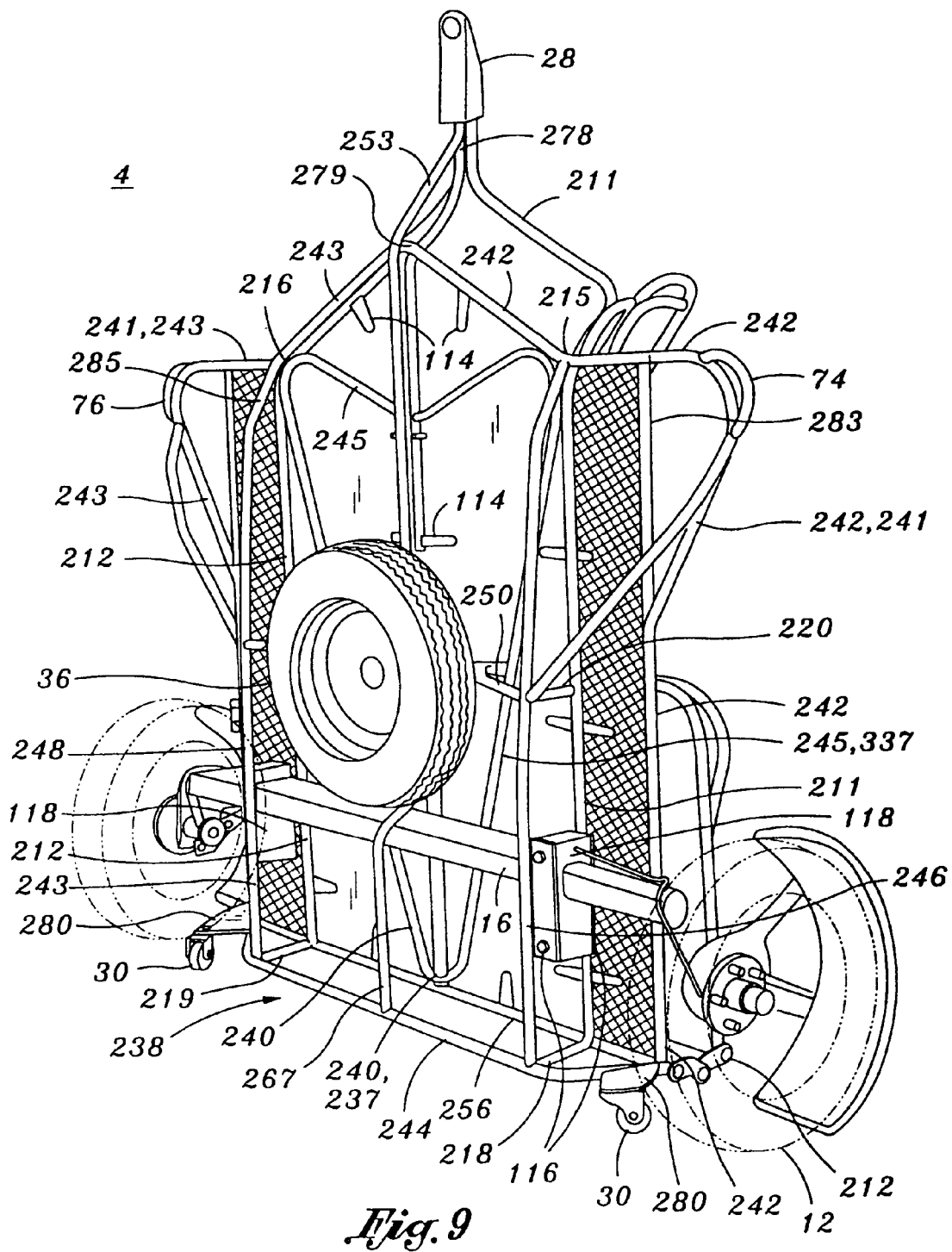
FIG. 9 is a rear perspective view of the second embodiment in a vertically stowed upright position, according to an aspect of the present invention.

Forward support section 209 primarily includes a forward tubular frame 238 as is best viewed in FIG. 9. The frame 238 preferably comprises a round tube steel double frame construction. The tubing material may vary with regard to strength, weight and dimension (e.g., diameter and thickness) depending on the specified capacity of the trailer 4. For instance, the tubing may be a high strength steel alloy for heavy duty trailer construction or a lightweight high strength aluminum alloy for a light weight build.

Forward tubular frame 238 preferably includes a main center support 240 comprised of a tubular member. Main center support 240 acts as the backbone of the forward tubular frame 238, extending from the most rearward end of the frame 328 through the entire main frame body, and further forming the trailer neck 278. A rear upper cross-member 256 is attached in a perpendicular transverse manner to the main center support 240 to form the most rearward end of the forward tubular frame 238. The frame 238 has a forward main body portion in which an A-frame is formed having an apex 279 which defines the front side of the main body portion of the frame 238 and the beginning of the trailer neck 278. Just past the apex 279, the main center support 240 has an upwardly inclined portion and another level portion adapted to receive trailer hitch 28.

Further defining forward tubular frame 238 is a leftside longitudinal member 211 and rightside longitudinal member 212 which are both laterally offset from the main center support 240 and parallel thereto. Both the leftside member 211 and the rightside member 212 are tied into the cross-member 256. Both leftside and rightside members 211, 212 have a first straight portion which spans the entire length of the trailer platform. At leftside and rightside intersection points 215, 216, both members 211, 212 are bent upwards to form an obtuse angle with the respective straight portions. A second portion of both leftside and rightside members 211, 212 is oriented along the obtuse angle. A third portion of leftside and rightside members 211, 212 is bent inwardly towards the center of the most forward center region of the trailer neck 278 until both third members meet with the third portion of the main center support 240 which forms an inner portion of the trailer neck 278. A fourth portion of leftside and rightside members 211, 212 are routed above the third portion of the main center support 240 to form the upper left and right portions of the trailer neck 278 of which is adapted to receive trailer hitch 28.

A platform perimeter member 241 is utilized to define the outer perimeter sides (left, lower frontside, and right) of the main platform of the trailer 4. For descriptive purposes, the platform perimeter member 241 is separated into an upper left main support 242 and an upper right main support 243. Although these frame members may be formed independently, a preferred embodiment forms platform perimeter 241 as one continuous frame member.

An upper left main support 242 is provided which defines the exterior left edge and forward left front edge of the main body of tubular frame 238. The left main support 242 has a first straight portion which is further laterally offset from the leftside longitudinal member 211. The first portion is connected to the left distal end of the crossmember 256 and runs parallel to and laterally along the leftside longitudinal member 211. At about beyond half the distance of the body of the frame 238, a second portion of left main support 242 flairs outward at an angle, and then a third portion is abruptly curved back towards the leftside intersection point 215 at a normal angle with respect to the leftside longitudinal member 211. A fourth portion of the left main support continues beyond the intersection point 215 which is oriented inward and forward towards apex 279.

Similarly, an upper right main support 243 is provided which defines the exterior right edge and forward right front edge of the main body of tubular frame 238. The right main support 243 has a first straight portion which is further laterally offset from the rightside longitudinal member 212. The first portion is connected to the right distal end of the crossmember 256 and runs parallel to and laterally along the rightside longitudinal member 212. At about beyond half the distance of the body of the frame 238, a second portion of right main support 243 flairs outward at an angle, and then a third portion is abruptly curved back towards the rightside intersection point 216 at a normal angle with respect to the rightside longitudinal member 212. A fourth portion of the right main support continues beyond the intersection point 216 which is oriented inward and forward towards apex 279.

At apex 279 where the left and right main supports 242, 243 converge, both supports 242, 243 may be connected together to form an arch which defines at least a portion of apex 279. As previously stated, supports 242, 243 may be one continuous tubular platform perimeter member 241 which includes the same portions as both supports 242, 243, begins at the left distal end of crossmember 256, is continuously connected at apex 279, and ends at the right distal end of crossmember 256 and has the same portions as both supports 242, 243. A left straight brace 283 and right straight brace 285 is extended from the first portions of left and right main supports 242, 243, and joined to the third transverse oriented portions of left and right main supports 242, 242.

In the alternative, the first portions of main supports 242, 243 may run the entire length of the body. And only the second, third, and fourth portions of 242, 243 are unitarily formed together. In this alternative embodiment, straight braces 283, 285 are eliminated. Furthermore, as shown in FIG. 9, left and right strengthening elbows 74, 76 are provided to add additional strength to the bend regions between the second and third portions of main supports 242, 243.

An arrowhead shaped inner brace 245 further provides support for the forward support section 209. The inner brace 245 includes a leftside inner brace 239 and a rightside inner brace 240. The tip of the arrowhead shaped inner brace 245 begins at the frame joint where the main center support 240 intersects the crossmember 256. At this joint, a first straight portion of leftside inner brace 239 is routed to the leftside intersection point 215 and then substantially bent into in an acute angle such that a second portion may be connected to the rightside of main center support 240 to form the backside of the arrowhead shape. Similarly, at the tip of the arrowhead shaped inner brace where the main center support 240 intersects the crossmember 256, a first straight portion of rightside inner brace 237 is routed to the rightside intersection point 216 and then substantially bent into in an acute angle such that a second portion which is connected to the leftside of main center support 240 to form the backside of the arrowhead shape. Thus, the main planar platform region of the tubular frame 238 of the forward support section 209 is formed at least by the first portion of main center support 240, the first portions of leftside longitudinal member 211 and rightside longitudinal member 212, the entire continuous tubular platform perimeter member 241, and arrowhead shaped inner brace 245.

Additionally, the tubular frame 238 also includes undercarriage bracing. In particular, at the joint where the leftside longitudinal member 211 intersects the upper rear crossmember 256, a leftside rear vertical member 218 is downwardly oriented. Similarly, at the joint where the rightside longitudinal member 212 intersects the upper rear crossmember 256, a rightside rear vertical member 219 is downwardly oriented. A lower rear crossmember 244 interconnects the leftside and rightside vertical members 218, 219 and further is bent and angled upwards to connect to the upper rear crossmember 256 where the most rearward ends of the first portions of upper left and right main supports 242, 243 intersect and are joined to crossmember 256. Thus, the upper rear crossmember 256 and the lower rear crossmember 244 define a planar rear surface of the tubular frame 238 which defines a folding interface that the foldable rear support section 210 will be hingedly interfaced thereto.

At the frame joint where the leftside rear vertical member 218 intersects the lower rear crossmember 244, a leftside lower longitudinal member 246 traverses the entire length of the main platform of the tubular frame 238, such that it is positioned directly underneath the first portion of the leftside longitudinal member 211 and is connected to the leftside intersection point 218. Similarly, a rightside lower longitudinal member 248 traverses the entire length of the main platform of the tubular frame 238, such that it is positioned directly underneath the first portion of the rightside longitudinal member 212 and is connected to the rightside intersection point 215. The side profile of the lower members 246, 248 is parallel and downwardly offset from the leftside and rightside longitudinal members 211, 212 in the rearward end of the tubular frame 238, however, the lower members 246, 248 are then increasingly bent upwards until members 246, 248 are joined to intersection points 215, 216.

At the midpoints of members 246, 248, a leftside middle vertical member 220 and rightside middle vertical member 221 interconnects members, 246, 248 to a mid-region of the leftside longitudinal member 211 and rightside longitudinal member 212, respectively.

Figure 10:
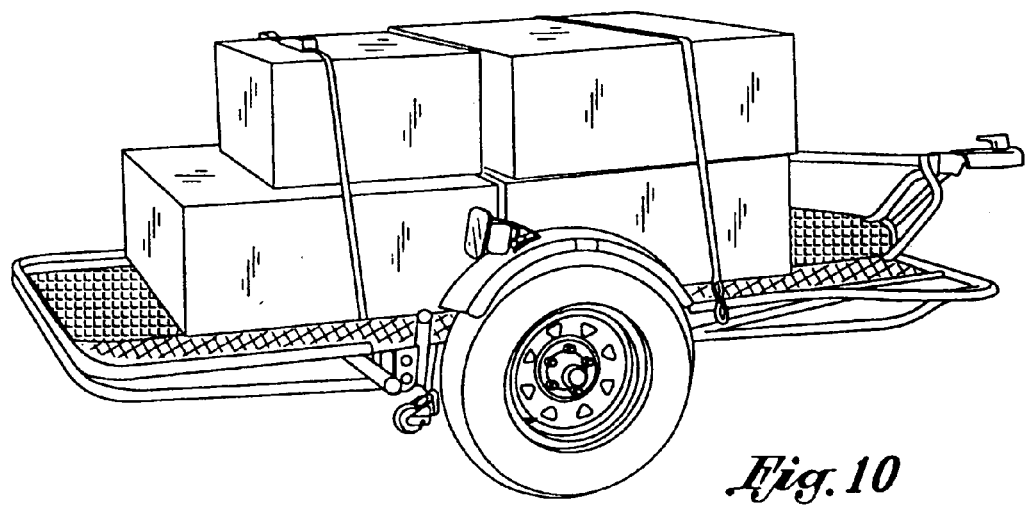
FIG. 10 is a side perspective view of the second embodiment converted into a flatbed configuration for carrying cargo.

Other lower frame supports include a lower rear center support 267 which is connected to a middle portion of the lower rear crossmember 244 and is oriented in a parallel and laterally downset manner from the main center support 240. At about one third the length of the trailer platform the lower rear crossmember 244 is upwardly curved after straight axle 16 such that it then connects directly to the main center support 240. Furthermore, a tire brace member 250 transversely spans the tubular frame 238 between the joints at which the middle vertical members 220, 221 connect to the leftside lower longitudinal member 246 and rightside lower longitudinal member 248. Thus, tire brace member 250 is oriented perpendicular to the main center support 240, and furthermore, is bent inward towards main center support 240 to form a recessed region in the tubular frame 238 that a spare tire 36 may be attached and stored. Also, a forward neck support 253 is provided for additional support. A first portion of a lower forward neck support 253 is positioned directly below and parallel thereto main center support 240 and further routed through apex 279. At apex 279, a second portion is bent upwards and connected to the third portion of the main center support 240 of the trailer neck 278. As is seen in FIGS. 8-10, a standard trailer hitch 28 assembly is preferably attached to the distal end of the trailer neck 278.

Foldable Rear Support Section of the Second Exemplary Embodiment

Figure 8:
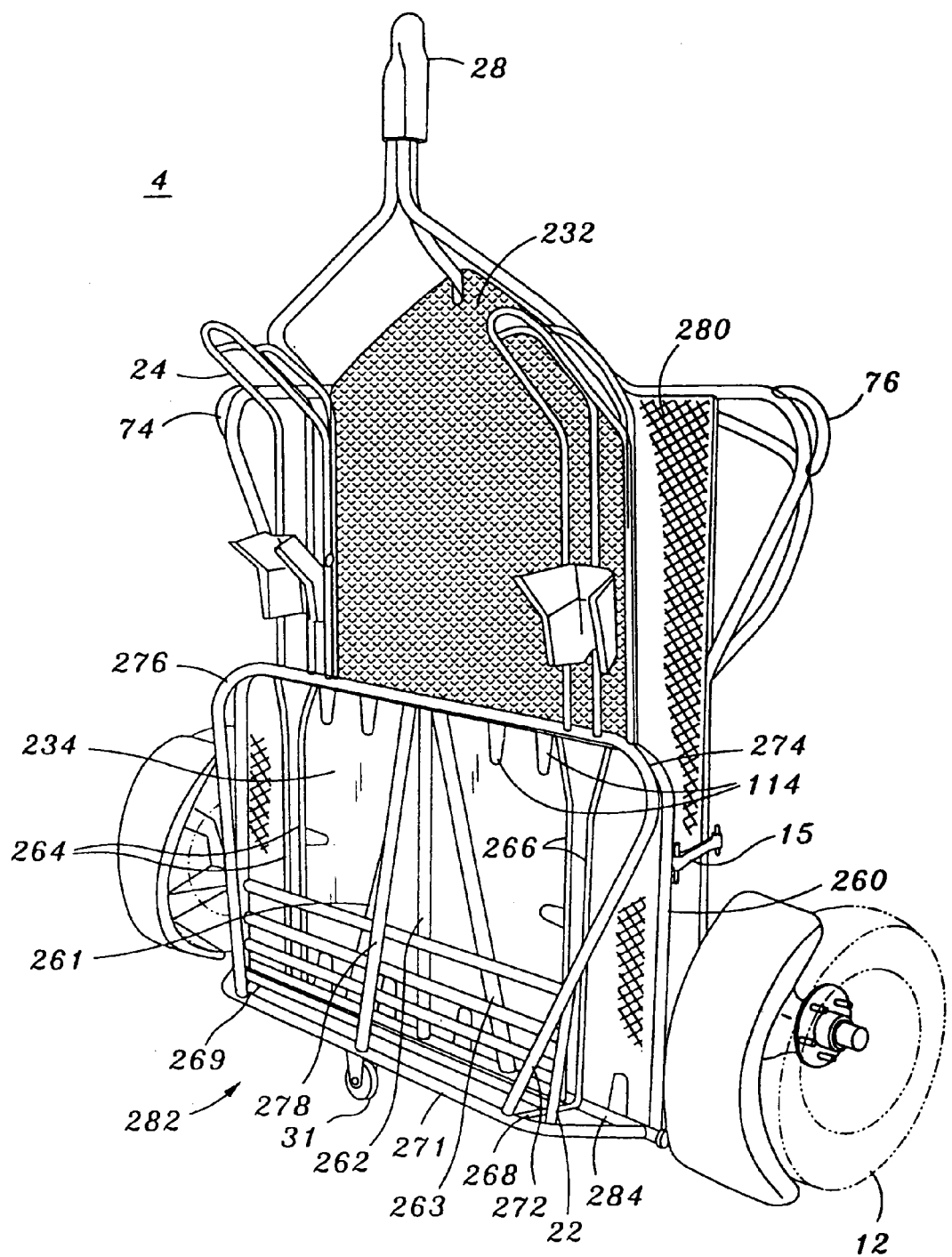
FIG. 8 is a front perspective view of the second embodiment in a vertically stowed upright position, according to an aspect of the present invention.

Foldable rear support section 210 includes a rear tubular frame 282 as illustrated in FIG. 8. The rear frame 282 preferably comprises a round tube steel double frame construction similar to the forward frame 238. The tubing material may vary with regard to strength, weight and dimension (e.g., diameter and thickness) depending on the specified capacity of the trailer. For instance, the tubing may be a high strength steel alloy for heavy duty trailer construction or a lightweight high strength aluminum alloy for a light weight build.

Rear tubular frame 282 preferably includes an upper crossmember 284 and a lower crossmember 286 oriented in the same direction as the upper and lower rear crossmembers 256, 244 of the forward tubular frame 238, so that a foldable interface is defined. In particular, upper crossmember 284 is positioned directly above and in parallel with lower crossmember 286. A U-shaped upper outer perimeter bar 260 is attached to the left and right distal ends of upper crossmember 284 to form a generally rectangular upper rear support section platform. In particular, a first portion of the U-shaped perimeter bar 260 (i.e., a leg of the U-shape) is attached perpendicular to the most distal left end of upper crossmember 284. A second portion of the U-shaped perimeter bar begins at a ninety degree bend wherein the second portion is parallel to and laterally offset from the upper crossmember 284. A third portion of the U-shaped perimeter bar 260 (i.e., a leg of the U-shape) begins at another ninety degree bend wherein the third portion is parallel to and laterally spaced offset from the first portion of the U-shaped perimeter bar 260. The third portion of the perimeter bar is attached to the most distal right end of the upper crossmember 284. Thus, the U-shaped perimeter bar 260 forms the outer perimeter edge of the rear tubular frame 282. A series of braces span the length of the rear tubular frame 282 (i.e., parallel with the first and third portions of the u-shaped perimeter bar 260). An upper center support 262 is connected to the center of upper crossmember 284 and at a middle position of the second portion of the u-shaped perimeter bar 260. A left bracing strut 261 is attached to the center of the second portion of the U-shaped perimeter bar 260 and further attached to a left portion of upper crossmember 284. A right bracing strut 263 is also attached to the center of the second portion of the U-shaped perimeter bar 260 and further attached to a right portion of upper crossmember 284. Furthermore, a left pair of parallel braces 264 and a right pair of parallel braces 266 are interconnected between the crossmember 284 and the second portion of the u-shaped perimeter bar 260. The plies of parallel braces 264, 266 provide structural support to the foldable rear support section 210 in the region of which motorcycles will be rolled over during loading and offloading.

Additionally, the rear tubular frame 282 includes undercarriage bracing. In particular, at the joint where the left pair of parallel braces 264 intersects the upper rear crossmember 284, a leftside rear vertical member 268 is downwardly oriented. Similarly, at the joint where the right pair of parallel braces 266 intersects the upper rear crossmember 284, a rightside rear vertical member 269 is downwardly oriented. A lower rear crossmember 271 interconnects the leftside and rightside vertical members 269, 270 and further is bent and angled upwards to connect to the upper rear crossmember 284 where the most rearward ends of the first portion and third portion of the U-shaped perimeter bar 260 attach to the upper rear crossmember 284. A second U-shaped lower perimeter bar 272 has a first portion which connects at the frame joint at which the leftside vertical member 269 is attached to the lower rear crossmember 271. The first portion is routed to the left rear corner 274 of the rear tubular frame. The lower perimeter bar 272 then is bent in an acute angle to form a second portion which is connected to and runs parallel along the second portion of the upper u-shaped outer perimeter bar 260. A third portion of the lower perimeter bar 272 is then formed by a bend which forms another acute angle in which the third portion is then attached to the lower rear crossmember 271 at the frame joint at which the rightside vertical member 270 is attached to the rear crossmember 271. From a side profile, the rear tubular frame 282 then has a most rearward end (i.e., the end of which a motorcycle or ATV is loaded or unloaded) which converges into a tapered end at which the second portions of the upper outer perimeter bar 260 and lower perimeter bar 272 converge and are attached thereto in parallel. An inclined center support 278 is further provided at a middle point of the lower rear crossmember 271 and it is routed such that it interconnects to a middle point of the second portion of the lower perimeter bar 272.

Integration of Forward Support Section, Foldable Rear Support Section, Axle, Suspension, Wheels and Casters of the First Embodiment The following paragraphs describe how the forward support section 209, foldable rear support section 210, decking 232, 234, grating panels 280, straight axle 16, independent torsion suspension 18, wheels and tires 12, stowable spare tire 36, caster wheel assemblies 30, 31 and other components of the stowable modular trailer 4 are interconnected to and integrated with each other.

Preferably diamond plate is utilized as the forward decking 232 which is attached to the upper surfaces of the forward support section 209. Also, diamond plate may be utilized as the rear decking 234 which is attached to the upper surfaces of the foldable rear support section 209. Moreover, any other type of plate material known in the art may utilized. As best shown in FIGS. 8 and 9, a plurality of mounting tabs 114 are provided on various regions of the upper regions of the main body of tubular frame 238 and rear tubular frame 282. The plurality of mounting tabs 114 are utilized to fasten the forward decking 232 to the upper portion of tubular frame 238 and to fasten the rear decking to the upper portion of rear tubular frame 282. Additionally, grating panels 280 may be mounted to forward tubular frame 238 and rear tubular frame 282. In particular, grating panels 280 may be positioned laterally next to the sides of forward decking 232. Further, grating 280 may be attached on the upper surface of the rear tubular frame 282. In particular, grating panels 280 may be positioned next to rear decking 234 such that the region that extends laterally to the first and third portions of the U-shaped outer perimeter box are covered by grating panels 280.

Figure 6:
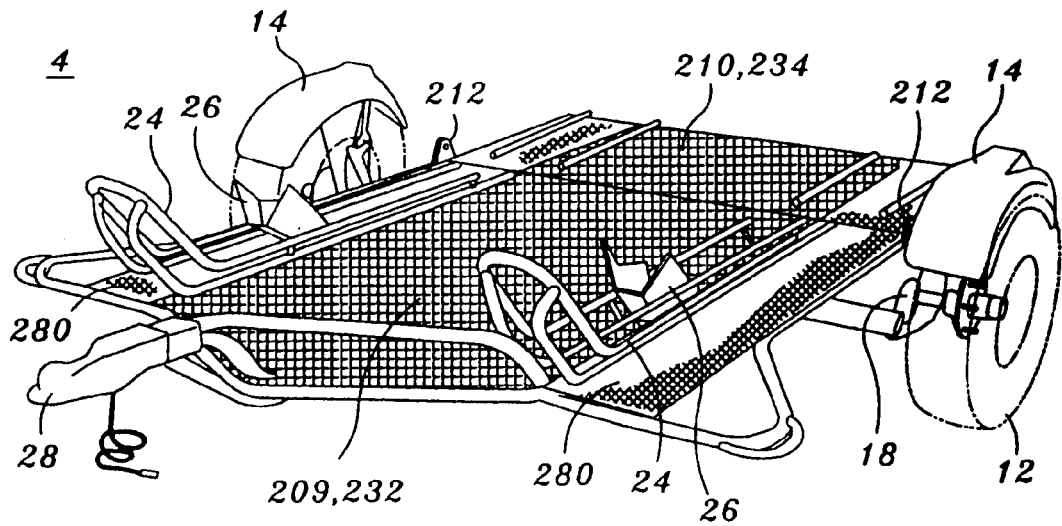
FIG. 6 is a frontside overhead perspective view of a second exemplary embodiment of a vertically stowable modular trailer configured for two motorcycles.
Figure 7:
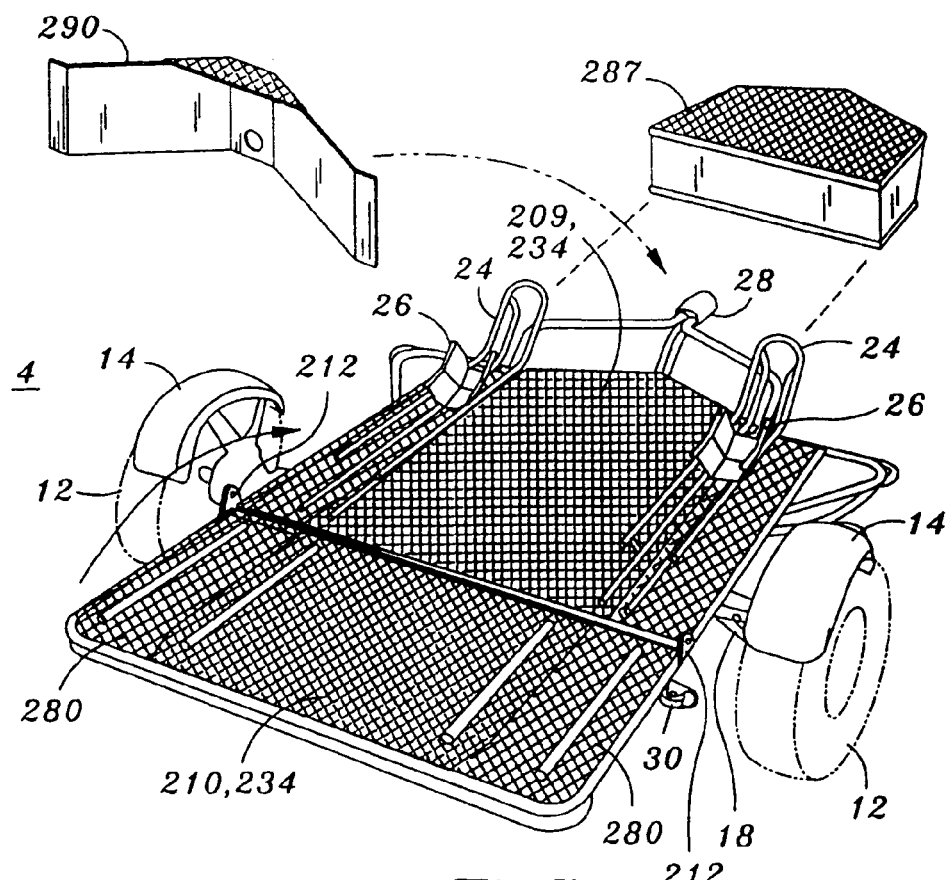
FIG. 7 is a backside overhead perspective view of the second exemplary embodiment of a vertically stowable modular trailer configured for two motorcycles.

Forward support section 209 and foldable rear support section 210 are rotatably attached via hinge assemblies 212 (see FIGS. 6-7). As a result, a hinged joint is formed between forward support section 209 and foldable rear support section 210. Thus, when trailer 4 is fully deployed (as shown in FIGS. 6-7 and 10-11), the horizontal plane defined by forward support section 209 is coincident with the horizontal plane defined by rear support section 210, thereby creating a continuous platform. However, when the trailer 4 is not in use, rear support section 210 may be folded about the axis defined by the pair of hinge assemblies 212 (see FIGS. 8 and 9) such that rear support section 210 is positioned either on top or vertically next to forward support section 209.

The stowable modular trailer 4 has an independent torsion suspension system which includes straight axle 16, left and right torsion suspension components 18, suspension mounting brackets 18, and suspension receiving brackets 116. The details of the suspension have already been discussed and therefore are not described in any further detail. A pair of upper and lower suspension receiving brackets 116 are positioned on the tubular frame 238 to receive suspension mounting brackets 118 which are rigidly attached to straight axle 16. Each pair of brackets 116 are positioned on the left side and right side of the body of the frame 238. In particular an upper bracket is attached to the first portion of the leftside longitudinal member 211 and a lower bracket is attached to the leftside lower longitudinal member 246. Similarly, an upper bracket is attached to the first portion of the rightside longitudinal member 212 and a lower bracket is attached to the rightside lower longitudinal member 248. The straight axle 16, which has a pair of suspension mounting brackets 118, is then received in the lower suspension receiving brackets 116.

Other components of the stowable modular trailer 4 include wheels and tires 12, fenders 14 and taillights 20 which are also well known in the art and therefore not described in any further detail. FIG. 9, clearly depicts that the under body of the tubular frame 238 is designed such that a spare tire and wheel 36 may be stored forward the straight axle 16 and within the recessed area adapted to receive the spare tire/rim 36. Another feature of the trailer 4 is the strategic placement of a pair of caster assemblies 30 on the underside of frame 238 at the most rearward end of the frame 238. In particular, a left and right caster assembly 30 is attached to the corners where the most rearward ends of the first portions of upper left and right main supports 242, 243 intersect the rear upper crossmember 256 to form corner joints. The caster assemblies 30 include an offset bracket 280 to allow for sufficient clearance.

Additionally, a third caster wheel 31 may be attached to the lower rear crossmember 271 of the foldable rear support section 210 (see FIG. 8). Moreover, a securing member 15 (see FIG. 8) is provided on the trailer 4 to secure the foldable rear support section 210 to the forward support section 209.

Removable Motorcycle Guide Rails of the Second Exemplary Embodiment

The second embodiment of modular trailer 4 may include a pair of removable motorcycle guide rails 24 and wheel chocks 26. Each guide rail 24 and wheel chock 26 assembly is similar to that discussed in the first embodiment, and therefore, further discussion on the specific design of the same is not necessary. The removability of the motorcycle guide rails 24 and chocks 26 from the second embodiment illustrates an aspect of the modular design of the present invention.

Stowable Loading Ramp of the Second Embodiment

The stowable modular trailer 4 may utilize a stowable loading ramp 22, such as is depicted as is being deployed in FIG. 11 and which is shown in a stowable position in FIG. 8. For the second embodiment, two ramps 22 are preferred to be provided to load an ATV, golf cart or the like. Ramp 22 (see FIG. 11) is adapted for loading and offloading both motorcycles and ATV vehicles if required. In particular, ramp 22 includes a pair of inner parallel rails 124 having a lower transverse rail 122 attached to the lower end of the pair. Also, a left 126 and right 128 rail are laterally positioned to the sides of the inner rails 124, thus forming a longitudinally rectangular shaped ramp. On the upper side of the ramp 22, an attaching feature 120 is incorporated to secure and attach the upper end of the ramp 22 to the tail end of the modular trailer 4.

Modular Accessories for the First and Second Exemplary Embodiments

Another aspect of the present invention is that is has been designed to accommodate modular accessories. For instance, removable utility boxes 287 (see FIG. 7) may be installed on both the single transport trailer 2 and the dual transport trailer 4. Furthermore, a stoneguard may be installed at the forward area of the trailers 2, 4 (see FIG. 7). Also, as already discussed, both trailers 2, 4 may utilize the same guide rail 24 and wheel chock 26 assembly.

Operation of First and Second Exemplary Embodiments

The following section will now briefly describe how to operate both trailers 2, 4. As depicted in FIG. 5 for the one motorcycle transport trailer 2, and in FIG. 9 for the two motorcycle transport trailer 4, when both trailers are vertically stowed, casters 30, 31 are engaged to the floor surface. Initially then, the trailer 2, 4 must be tilted down off casters 30, 31. By tilting down the trailer 2, 4, the trailer neck 78, 278 will be lowered such that the trailer hitch 28 may be attached to a towing vehicle. When the trailer is being tilted downward, the forward support section 9, 209 will rotate about an axis defined by the wheels 12. The trailer neck 78, 278 may then be securely hitched to the towing vehicle.

Next, the rear support section 10, 210 may be folded about hinges 112 until the rear support section 10, 210 is fully deployed to form a platform such as shown in FIGS. 1-2 and 6-7. Next, the loading ramp(s) 22 may being destowed and attached to the tail end of the trailer 2, 4 such as is shown in FIG. 11. Then the motorcycle may be loading onto the trailer 2, 4 by rolling the wheels into guide rail 24 and over wheel chock 26 until the chock 26 flips over and secure the motorcycle wheel. If desired, tie down straps may then be utilized to secure the motorcycle to the trailer 2, 4.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A trailer comprising:
   a forward support frame having a first upper platform and a rear interface side projecting downward from the first upper platform;
   a trailer neck connected to the forward support frame and extending therefrom;
   a first planar deck plate attached to and covering a substantial portion of the first upper platform;
   a pair of caster wheels attached proximate the rear interface side;
   a rear support frame having a second upper platform and a forward interface side projecting downward from the second upper platform;
   a second planar deck plate attached to and covering a substantial portion of the second upper platform;
   a third caster wheel attached to the forward interface side; and
   at least one hinge interconnecting the rear interface and forward interface sides;
   wherein the trailer is adapted to be configured in a deployed mode in which the rear and forward interfaces are positioned adjacent each other such that the forward and rear support frames form a generally oriented common flatbed platform for supporting a payload;
   wherein the trailer is further adapted to be configured in a vertically stowed mode in which the first and second planar deck plates are adapted to be positioned adjacent each other in an upright position.

2. The trailer of claim 1 further including a straight axle assembly mounted to the trailer, the assembly including a pair of wheel and tire assemblies mounted on opposing hub ends thereof.

3. The trailer of claim 2 wherein the straight axle assembly is mounted transversely across the forward support frame.

4. The trailer of claim 1, further comprising at least one loading ramp adapted to be stored within the rear support frame.

5. The trailer of claim 4, wherein one end of said at least one loading ramp may be attached to a rear end of the rear support frame and another end is positioned to engage a supporting surface of the trailer.

6. The trailer of claim 1 wherein when the trailer is vertically stowed, the pair of caster wheels and the third caster wheel are in contact with a supporting surface of the trailer, and when the trailer is deployed, the pair of caster wheels and the third caster wheel are elevated from the supporting surface of the trailer.

7. The trailer of claim 1 wherein the forward support frame has a recess underneath the first upper frame which is adapted to receive a spare wheel and tire assembly.

8. The trailer of claim 1 wherein the trailer is configured to transport at least one motorcycle.

9. The trailer of claim 8 further comprising at least one motorcycle guide rail assembly removably attached to the first upper frame.

10. The trailer of claim 9 wherein the motorcycle guide rail assembly further comprises a pivotable wheel chock assembly.

11. The trailer of claim 1, the forward support frame, first upper frame and first planar deck plate having a forward apex shaped portion adapted to receive one of a removable stone guard or a removable utility box.

12. The trailer of claim 1 further comprising a plurality of grating panels attached to the first upper frame of the forward support frame and the second upper frame of the rear support frame, the grating panels laterally positioned outboard to the left and right of the first and second planar deck plates.

13. The trailer of Claim 1 further comprising a pair of bumper bars projecting laterally outward from both sides of the forward support frame.

14. A vertically stowable modular multi-purpose trailer comprising:
   a forward support frame including a first upper frame and a rear interface side attached to the first upper frame;
   a first planar deck plate attached to the first upper frame of the forward support frame, the first planar deck plate covering a substantial portion of the first upper frame;
   a trailer neck connected to the forward support frame;
   a straight axle assembly being mounted to the forward support frame;
   a rear support frame including a second upper frame and a forward interface side being attached to the second upper frame;
   a second planar deck plate attached to the second upper frame, the second planar deck plate covering a substantial portion of the second upper frame;
   a plurality of caster wheels, at least one caster wheel being attached proximate the rear interface and at least one caster wheel being attached to the forward interface side; and
   at least one hinge interconnecting the rear interface of the forward support frame and forward interface of the rear support frame;
   wherein the trailer is adapted to be configured in a deployed mode in which the rear and forward interfaces are positioned adjacent each other such that the forward and rear support frames form a generally oriented common flatbed platform for supporting a payload;
   wherein the trailer is further adapted to be configured in a vertically stowed mode in which the first and second planar deck plates are adapted to be positioned adjacent each other in an upright position.

15. The trailer of claim 14 wherein the straight axle assembly includes a pair of wheel and tire assemblies mounted on opposing hub ends thereof.

16. The trailer of claim 14 wherein the straight axle assembly is mounted transversely across the forward support frame underneath the first upper frame.

17. The trailer of claim 14 wherein when the trailer is vertically stowed, the caster wheels are in contact with a supporting ground surface, and wherein when the trailer is deployed, the caster wheels are elevated from the supporting ground surface.

18. The trailer of claim 14 wherein the forward support frame has a recess underneath the first upper frame which is adapted to receive a spare wheel and tire assembly.

19. The trailer of claim 14 wherein the trailer is configured to transport at least one motorcycle.

20. The trailer of claim 19 further comprising at least one motorcycle guide rail assembly removably attached to the first upper frame of the forward support frame.

21. The trailer of claim 20 wherein the motorcycle guide rail assembly further comprises a pivotable wheel chock assembly.

\* \* \* \* \*